United States Patent [19]
Bender et al.

[11] Patent Number: 5,798,063
[45] Date of Patent: Aug. 25, 1998

[54] MOLDING PROCESS USING GAS UNDER PRESSURE

[75] Inventors: Klaus Bender, Stuttgart, Germany; Philippe Leboeuf, Paris, France; Georgios Topulos, Geneva, Switzerland

[73] Assignee: E. I. du Pont de Nemours and Company, Wilmington, Del.

[21] Appl. No.: 809,643

[22] PCT Filed: Oct. 2, 1995

[86] PCT No.: PCT/US95/13121

§ 371 Date: Mar. 27, 1997

§ 102(e) Date: Mar. 27, 1997

[87] PCT Pub. No.: WO96/10476

PCT Pub. Date: Apr. 11, 1996

[30] Foreign Application Priority Data

Oct. 3, 1994 [EP] European Pat. Off. ............ 94202857

[51] Int. Cl.⁶ .................... B29C 44/04; B29C 44/06
[52] U.S. Cl. .................... 264/45.5; 264/50; 264/54; 264/572
[58] Field of Search .................... 264/45.5, 572, 264/50, 54

[56] References Cited

U.S. PATENT DOCUMENTS

| | | | |
|---|---|---|---|
| 4,092,385 | 5/1978 | Balevski et al. | 264/45.5 |
| 5,093,053 | 3/1992 | Eckardt et al. | 264/572 |
| 5,437,823 | 8/1995 | Hettinga et al. | 264/45.5 |
| 5,474,723 | 12/1995 | Horikoshi | 264/45.5 |

FOREIGN PATENT DOCUMENTS

| | | | |
|---|---|---|---|
| 54-34378 | 3/1979 | Japan | 264/572 |
| 59-452826 | 8/1984 | Japan | 264/45.5 |
| 59-120429 | 11/1984 | Japan . | |
| 4-144721 | 5/1992 | Japan | 264/45.5 |

*Primary Examiner*—Allan R. Kuhns

[57] ABSTRACT

A process for making injection molded articles having a substantially smooth outer surface and a foamed core by injecting a molten thermoplastic into a mold, and, when the outer surface has formed, injecting a gas under pressure into the mold whereby a limited amount of molten material flows back into the injection unit to create a hollow space in the core of the melt, and releasing the gas pressure to allow the core to foam.

7 Claims, 1 Drawing Sheet

MOLDING PROCESS USING GAS UNDER PRESSURE

BACKGROUND OF THE INVENTION

The present invention relates to a process for making an injection molded article having a substantially smooth outer surface and a foamed core, as well as to a molded article so produced.

BRIEF DESCRIPTION OF THE PRIOR ART

In the case of conventional low pressure injection molding systems, foaming occurs virtually instantaneously as the melt enters the cavity and melt pressure decays to atmospheric pressure. As a result, however, articles so molded tend not to have smooth outer surfaces.

Various processes for making an injection molded article with a substantially smooth outer surface and a foamed core are known in the art. One such process is referred to as a "high pressure molding process". This process operates by maintaining a homogeous melt phase of a thermoplastic polymer containing dissolved gas within a molding cavity after injection of the polymer. Foaming of the polymer melt is induced by the controlled decay of melt pressure to levels below the solution pressure of the dissolved gases. The control over melt pressure decay rates is achieved by mechanical movement of a mold face, a retracting pin (in an integral skin molding system) or a control over the decay rate of air pressure within the cavity (in a counter pressure foam molding system); c.f "The Injection Moulding of Cellular Thermoplastics", 1985, a brochure available from Schering Industrial Chemicals, Cambridge, England.

These known processes have certain disadvantages. A molding process which makes use of integral skin molding can only be carried out with equipment of relatively simple design. The mechanical movement of the mold face necessitates that the mold have a simple shape, and thus, such processes are only suitable for preparing articles of simple shape.

A process that makes use of counter pressure foam molding has the disadvantage that permits a maximum reduction in density of only about 8% over a non-foamed article. For certain end uses, it is desirable to have very low density, i.e. highly foamed articles.

Accordingly, it is an object of the present invention to provide a process for making an injection molded article having a substantially smooth outer surface a foamed core which is capable of forming articles having shapes more complex than those possible using integral skin molding technology and having densities lower than those possible using counter pressure foam molding technology (e.g. a reduction in density of 10% and greater).

The object of the present invention is obtained through a process comprising the steps of (a) injecting a melt of a thermoplastic polymer containing a foaming agent through an injection unit into a mold and maintaining said melt under a holding pressure to form an article having a substantially smooth outer surface;

(b) releasing the holding pressure of the melt and introducing a gas under pressure into the mold to create a hollow space in the melt by returning a portion of the melt from the mold back to the injection unit;

(c) closing the injection unit to prevent melt from flowing back into the mold; and (d) releasing the pressure of the introduced gas to allow foaming of the melt.

These, and other features of the invention shall be described in greater detail below.

DETAILED DESCRIPTION OF THE INVENTION

As used herein, a "substantially smooth" outer surface of the foamed article of the present invention means an outer surface (skin) that is substantially free from pits, surface irregularities, roughness and other such surface defects, and which approximates the smoothness of a non-foamed article.

The present invention can be practiced with molding devices and equipment that are currently commercially available. Such equipment includes a standard injection molding machine with a shut-off nozzle, and a gas injection unit (c.f. aforementioned brochure from Schering). Gas is introduced into the mold using any suitable gas injection needle.

A detailed description of a suitable embodiment for carrying out the process of the present invention shall now be given.

Figure 1:
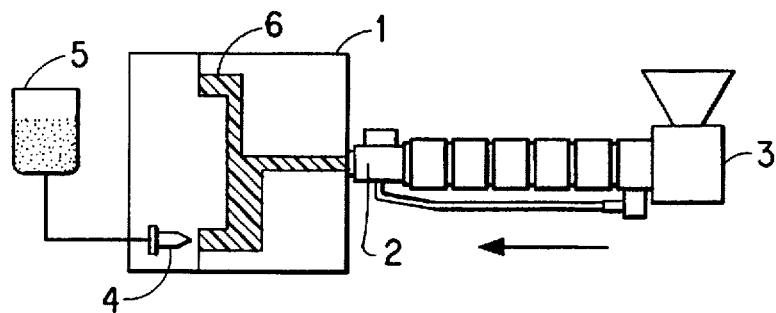
FIG. 1 shows a molding apparatus suitable for use in the present invention, consisting of a mold 1, an injection molding machine 3 having a injection unit 2, a gas injection needle 4 and a pressurized gas source 5 for the gas injection needle 4. Thermoplastic melt is indicated as 6.

As shown in FIG. 1, a melt of a thermoplastic containing a foaming agent is injected into mold 1 through injection unit 2 located on molding machine 3. Injection unit 2 will contain a back flow valve which prevents flow of the melt back into the injection unit (more precisely, the barrel of the injection unit) while there is pressure in the mold cavity.

The mold is substantially entirely filled with the thermoplastic melt. The melt can thereby be kept under a holding pressure which prevents foaming and allows formation of a substantially smooth outer surface (skin).

The mold will typically be held at a pressure ranging from 200 to 1000 bar.

Figure 2:
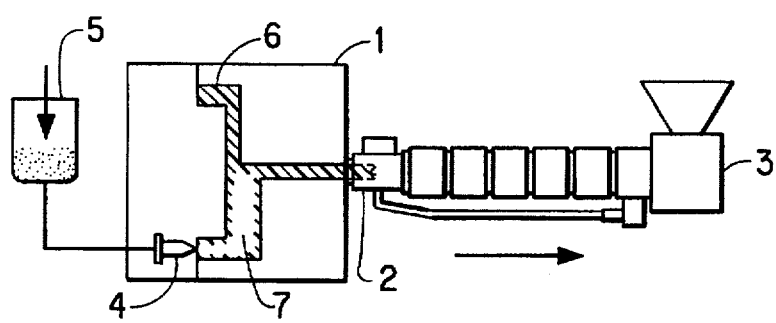
FIG. 2 depicts the apparatus of FIG. 1 after pressurized gas is introduced into mold 1 to force a portion of the melt back into injection unit 2 to create hollow space 7.

As indicated in FIG. 2, the holding pressure in mold 1 is then released, and a gas from source 5 is introduced through needle 4 into the mold to create a hollow space 7 in the melt which forces a portion of the thermoplastic melt out of the mold back into injection unit 2. The gas used is preferably nitrogen.

The gas is preferably introduced into the mold at a pressure typically from 50 to 400 bar.

After a portion of the melt is forced out of the mold back into the injection unit, an actuator causes a valve to close to prevent further melt from flowing back into the injection unit. The actuator may be any suitable device which senses flow of thermoplastic out of the mold and into the injection unit. A suitable such actuator is a screw, which, when displaced by the thermoplastic a set distance, causes the aforementioned valve to close.

Preferably, from 10 to 70% by weight of thermoplastic that is originally injected into the mold is removed from the mold.

Figure 3:
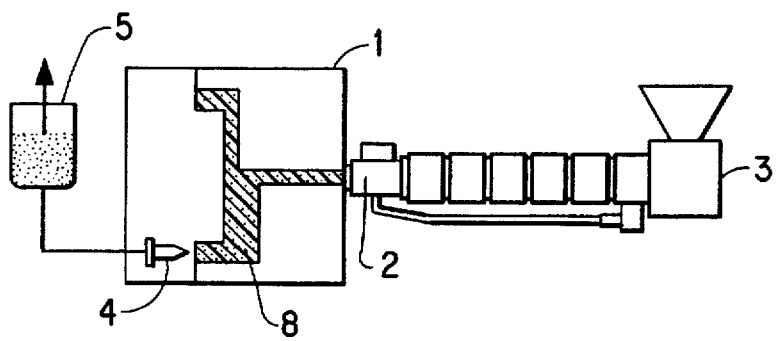
FIG. 3 indicates a pressure release of the gas which allows foaming of the melt.

As indicated in FIG. 3, the pressure of the introduced gas is then released, thereby allowing foaming of the melt. As this occurs, the hollow space is filled with foamed melt, thereby yielding an injection molded article having a substantially smooth outer surface and a foamed core 8.

Figure 4:
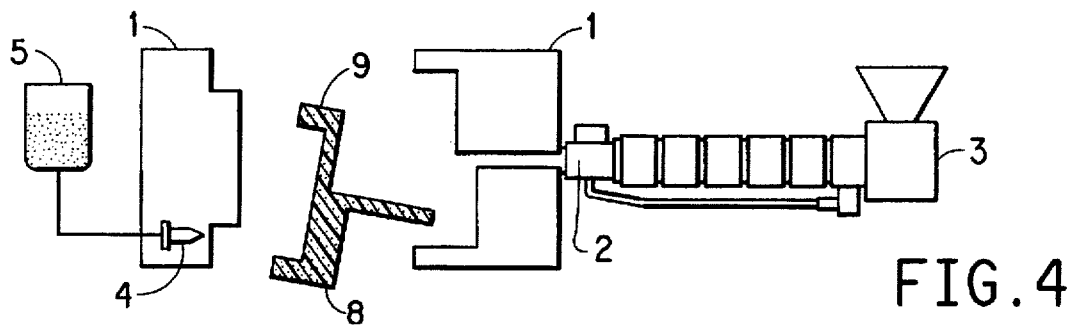
FIG. 4 shows removal of the molded article after sufficient cooling.

Subsequently, as indicated in FIG. 4, the molded article having a foamed core 8 and substantially smooth outer surface 9 is cooled sufficiently and removed from the mold.

The process of the present invention may be carried out on many types of known thermoplastics, including block copolyether esters (e.g. HYTREL®, available from the DuPont Company), block copolyether amides, polyurethanes, copolyetherimide esters, polyolefins and polyolefin copolymers, styrene alloys and copolymers, polyvinyl chloride, polyesters, polyamides and polycarbonates.

Suitable foaming agents are those known in the art, and include gases and chemical foaming agents such as sodium bicarbonate, diazodicarbonamide and sulfonyl hydrazides.

The chemical foaming agent will typically comprise up to 5% by weight of the thermoplastic.

PRACTICAL EXAMPLE

Injection Molding of an Automobile Door Handle

A thermoplastic copolyether ester (HYTREL® 4056) containing 2% by weight of a foaming agent (HYDROCEROL BIH 70 available from Boehringer Ingelheim KG) is molded in a door handle mold on an Engel 145t injection molding machine having an HC 500 screw type, and being equipped with an Engel gas injection unit and an Engel EC 88 control unit.

The melt is maintained at 180° C. and the injection unit is maintained at the following temperature profile:

| | BARREL | | | |
|---|---|---|---|---|
| | Nozzle | Front | Center | Rear |
| Temp (°C.) | 150 | 180 | 175 | 155 |

The melt is injected at a rate of 50 mm/sec into the mold for a period of 1.3 sec. and maintained at a holding pressure of 500 bar for 1 sec with a pad of 5.7 mm; subsequently the holding pressure is released.

Nitrogen gas is then introduced into the mold at a pressure of 200 bar and is maintained for 20 sec such that approximately 50% by weight of the melt is forced out of the mold and back into the injection unit.

The pressure of the nitrogen gas is released to permit foaming for a period of 35 sec while at the same time the molded door handle so produced cools and can be ejected from the mold cavity.

We claim:

1. A process for injection molding an article having a substantially smooth outer surface and a foamed core comprising the steps of (a) injecting a melt of a thermoplastic polymer containing a foaming agent through an injection unit into a mold to entirely fill the mold cavity and maintaining said melt under a holding pressure to form an article having a substantially smooth outer surface;

(b) releasing the holding pressure of the melt and introducing a gas under pressure into the mold to create a hollow space in the melt by simultaneously forcing a portion of the melt to return to the injection unit;

(c) closing the injection unit to prevent melt from flowing back into the mold; and (d) releasing the pressure of the introduced gas to allow foaming of the melt.

2. A process according to claim 1 wherein from 10 to 70% by weight of melt is returned to the injection unit in step (b).

3. A process according to claim 1 wherein the gas is introduced into the mold at a pressure from 50 to 400 bar.

4. A process according to claim 1 wherein the gas is nitrogen.

5. A process according to claim 1 wherein the thermoplastic polymer is selected from the group consisting of block copolyether esters, block copolyether amides, polyurethanes, copolyetherimide esters, polyolefins and polyolefin copolymers, styrene alloys and copolymers, polyvinyl chloride, polyesters, polyamides and polycarbonates.

6. A process according to claim 1 wherein the foaming agent is a gas or a chemical foaming agent.

7. A process according to claim 6 wherein the melt contains up to 5% by weight chemical foaming agent.

* * * * *